US006893353B2

(12) United States Patent
Dutkiewicz et al.

(10) Patent No.: US 6,893,353 B2
(45) Date of Patent: May 17, 2005

(54) ROLLING BALL SPLINE SLIP JOINT FORMED FROM TWO TUBULAR MEMBERS

(75) Inventors: Jeffrey A. Dutkiewicz, Toledo, OH (US); Daniel W. Gibson, Maumee, OH (US); Mark S. Williams, Swanton, OH (US)

(73) Assignee: Torque-Traction Technologies, Inc., Holland, OH (US)

(*) Notice: Subject to any disclaimer, the term of this patent is extended or adjusted under 35 U.S.C. 154(b) by 0 days.

(21) Appl. No.: 10/174,518

(22) Filed: Jun. 18, 2002

(65) Prior Publication Data

US 2003/0232656 A1 Dec. 18, 2003

(51) Int. Cl.$^7$ .......................... F16C 3/035; F16D 3/06
(52) U.S. Cl. ........................................ 464/167; 384/49
(58) Field of Search ............................ 464/162, 167, 464/146, 906, 145; 384/49

(56) References Cited

U.S. PATENT DOCUMENTS

| | | | |
|---|---|---|---|
| 754,066 A | * | 3/1904 | Hoffmann .................. 464/167 |
| 2,992,548 A | * | 7/1961 | Muller et al. ............... 464/162 |
| 4,257,244 A | * | 3/1981 | Welschof .................... 464/167 |
| 4,705,491 A | * | 11/1987 | Andersson .................. 464/167 |
| 4,981,459 A | | 1/1991 | Klinkenberg |
| 5,611,733 A | | 3/1997 | Jacob et al. |
| 5,651,738 A | | 7/1997 | Jacob et al. |
| 5,692,961 A | | 12/1997 | Turner |
| 6,123,623 A | | 9/2000 | Sugiyama |
| 6,217,456 B1 | * | 4/2001 | Jacob .......................... 464/167 |
| 6,234,908 B1 | | 5/2001 | Jacob |
| 6,254,487 B1 | | 7/2001 | Jacob |
| 6,343,993 B1 | * | 2/2002 | Duval et al. ................ 464/167 |
| 2001/0018369 A1 | | 8/2001 | Cernak et al. |
| 2003/0100378 A1 | | 5/2003 | Schwarzler et al. |

FOREIGN PATENT DOCUMENTS

| | | |
|---|---|---|
| DE | 3513340 | 4/1985 |
| DE | 3513340 | 10/1986 |

* cited by examiner

Primary Examiner—Kenn Thompson
(74) Attorney, Agent, or Firm—MacMillan, Sobanski & Todd, LLC

(57) ABSTRACT

A rolling ball spline type of slip joint includes a first tubular member having a plurality of inwardly extending regions formed therein. The first tubular member has a wall thickness that is essentially uniform throughout the circumference thereof. The slip joint also includes a second tubular member having a plurality of outwardly extending regions formed therein. The inwardly extending regions of the first tubular member are radially aligned with the outwardly extending region of the second tubular member to define a plurality of longitudinally extending raceways. The second tubular member has a wall thickness that is essentially uniform throughout the circumference thereof. A plurality of balls is disposed in each of the raceways for transmitting rotational force between the first and second tubular members, while accommodating a limited amount of relative axial movement therebetween.

18 Claims, 5 Drawing Sheets

ROLLING BALL SPLINE SLIP JOINT FORMED FROM TWO TUBULAR MEMBERS

BACKGROUND OF THE INVENTION

This invention relates in general to slip joints for transmitting rotational force from a source to a driven mechanism, while accommodating a limited amount of relative axial movement therebetween. In particular, this invention relates to an improved structure for a rolling ball spline type of slip joint that is formed from two tubular members and to a method of manufacturing same.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a first universal joint is usually connected between the output shaft of the engine/transmission assembly and a first end of the driveshaft assembly, while a second universal joint is usually connected between a second end of the driveshaft assembly and the input shaft of the axle assembly. The universal joints provide a rotational driving connection from the output shaft of the engine/transmission assembly through the driveshaft assembly to the input shaft of the axle assembly, while accommodating a limited amount of angular misalignment between the rotational axes thereof.

Not only must a typical drive train system accommodate a limited amount of angular misalignment between the source of rotational power and the rotatably driven device, but it must also typically accommodate a limited amount of relative axial movement therebetween. For example, in most vehicles, a small amount of such relative axial movement frequently occurs when the vehicle is operated. To address this, it is known to provide a slip joint in the driveshaft assembly. A typical slip joint includes first and second members that have respective structures formed thereon that cooperate with one another for concurrent rotational movement, while permitting a limited amount of axial movement to occur therebetween. Two types of slip joints are commonly used in conventional driveshaft assemblies, namely, a sliding spline type and a rolling ball spline type.

A typical sliding spline type of slip joint includes male and female members having respective pluralities of splines formed thereon. The male member is generally cylindrical in shape and has a plurality of outwardly extending splines formed on the outer surface thereof. The male member may be formed integrally with or secured to an end of the driveshaft assembly described above. The female member, on the other hand, is generally hollow and cylindrical in shape and has a plurality of inwardly extending splines formed on the inner surface thereof. The female member may be formed integrally with or secured to a yoke that forms a portion of one of the universal joints described above. To assemble the slip joint, the male member is inserted within the female member such that the outwardly extending splines of the male member cooperate with the inwardly extending splines of the female member. As a result, the male and female members are connected together for concurrent rotational movement. However, the outwardly extending splines of the male member can slide relative to the inwardly extending splines of the female member to allow a limited amount of relative axial movement to occur between the engine/transmission assembly and the axle assembly of the drive train system.

A typical rolling ball spline type of slip joint includes male and female members having respective pluralities of longitudinally extending grooves formed thereon. The male member is generally cylindrical in shape and has a plurality of inwardly extending grooves formed in the outer surface thereof. The male member may be formed integrally with or secured to an end of the driveshaft assembly described above. The female member, on the other hand, is generally hollow and cylindrical in shape and has a plurality of outwardly extending grooves formed in the inner surface thereof. The female member may be formed integrally with or secured to a yoke that forms a portion of one of the universal joints described above. To assemble the slip joint, the male member is inserted within the female member such that the inwardly extending grooves of the male member are aligned with the outwardly extending grooves of the female member. A plurality of balls is disposed in each of the aligned pairs of the grooves. As a result, the male and female members are connected together for concurrent rotational movement. However, the male member can slide relative to the inwardly extending splines of the female member to allow a limited amount of relative axial movement to occur between the engine/transmission assembly and the axle assembly of the drive train system.

The rolling ball spline type of slip joint is generally considered to be more desirable than the sliding spline type of slip joint because the amount of force that is required to effect relative axial movement between the male and female members is much smaller, particularly when relative axial movement is attempted while torque is being transmitted through the slip joint. However, the rolling ball spline type of slip joint is more complex in structure and more expensive to manufacture than the sliding spline type of slip joint. Also, in a rolling ball spline type of slip joint, either or both of the male and female members are usually initially formed by forging a solid member to a desired shape. Then, material is removed from either or both of the male and female members to form the longitudinally extending grooves therein. Although this manufacturing process has functioned satisfactorily, it has been found to be somewhat complicated and costly. Thus, it would be desirable to provide an improved structure for a rolling ball spline type of slip joint, and a method of manufacturing same, that is simpler in structure and less expensive to manufacture than previously known.

SUMMARY OF THE INVENTION

This invention relates to an improved structure for a rolling ball spline type of slip joint, and a method of manufacturing same, that is simpler in structure and less expensive to manufacture than previously known. The slip joint includes a first tubular member having a plurality of inwardly extending regions formed therein. The first tubular member has a wall thickness that is essentially uniform throughout the circumference thereof. The slip joint also includes a second tubular member having a plurality of outwardly extending regions formed therein. The inwardly extending regions of the first tubular member are radially aligned with the outwardly extending region of the second tubular member to define a plurality of longitudinally extending raceways. The second tubular member has a wall thickness that is essentially uniform throughout the circumference thereof. A plurality of balls is disposed in each of the raceways for transmitting rotational force between the first and second tubular members, while accommodating a limited amount of relative axial movement therebetween.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
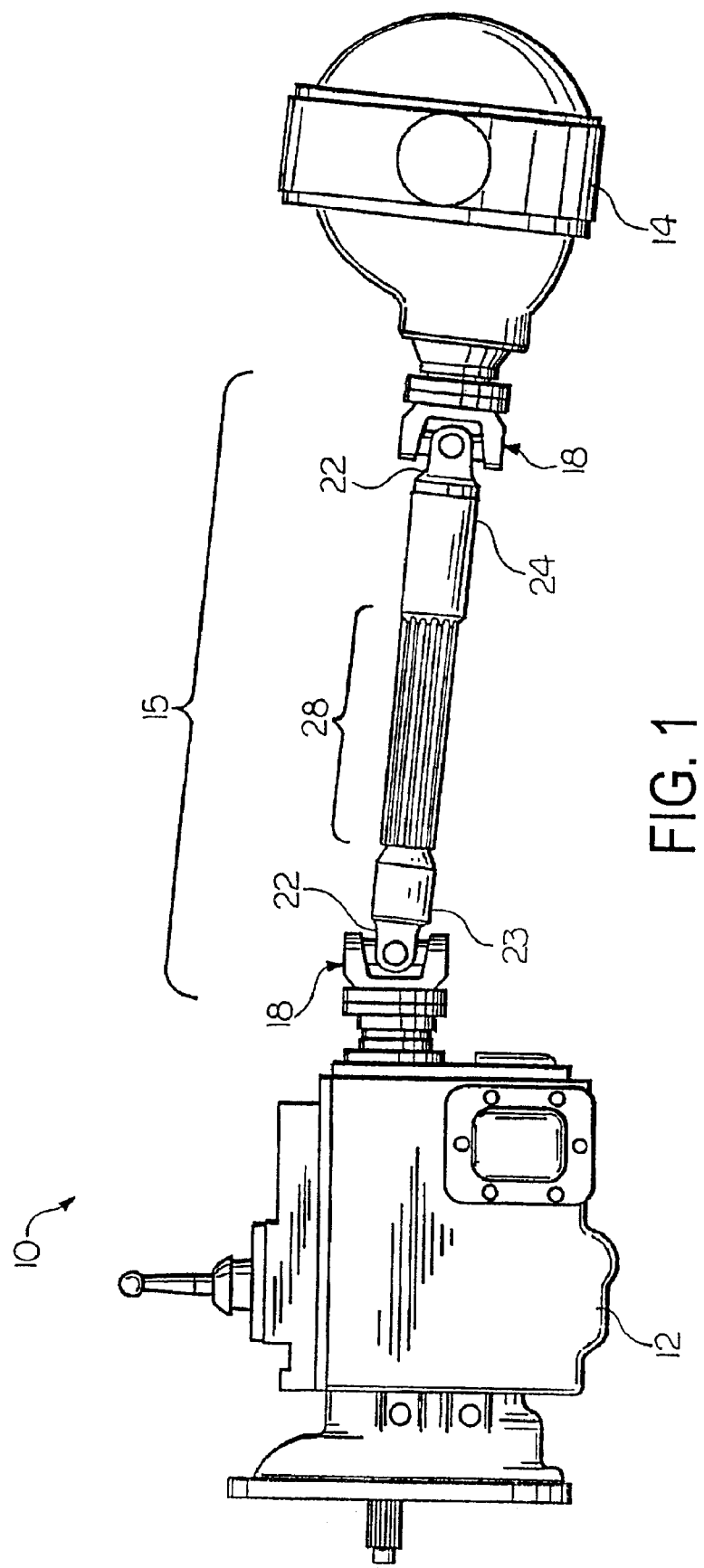
FIG. 1 is a side elevational view of a vehicle drive train system including a rolling ball spline type of slip joint in accordance with this invention.

Referring now to the drawings, there is illustrated in FIG. 1 a drive train system, indicated generally at 10, in accordance with this invention. The illustrated drive train system 10, which is intended to be representative of any drive train system (vehicular or otherwise) for transferring rotational power from a source to a driven device, includes a transmission 12 having an output shaft (not shown) that is connected to an input shaft (not shown) of an axle assembly 14 by a driveshaft assembly 15. The structures of the transmission 12 and the axle assembly 14 are conventional in the art and form no part of this invention.

Figure 2:
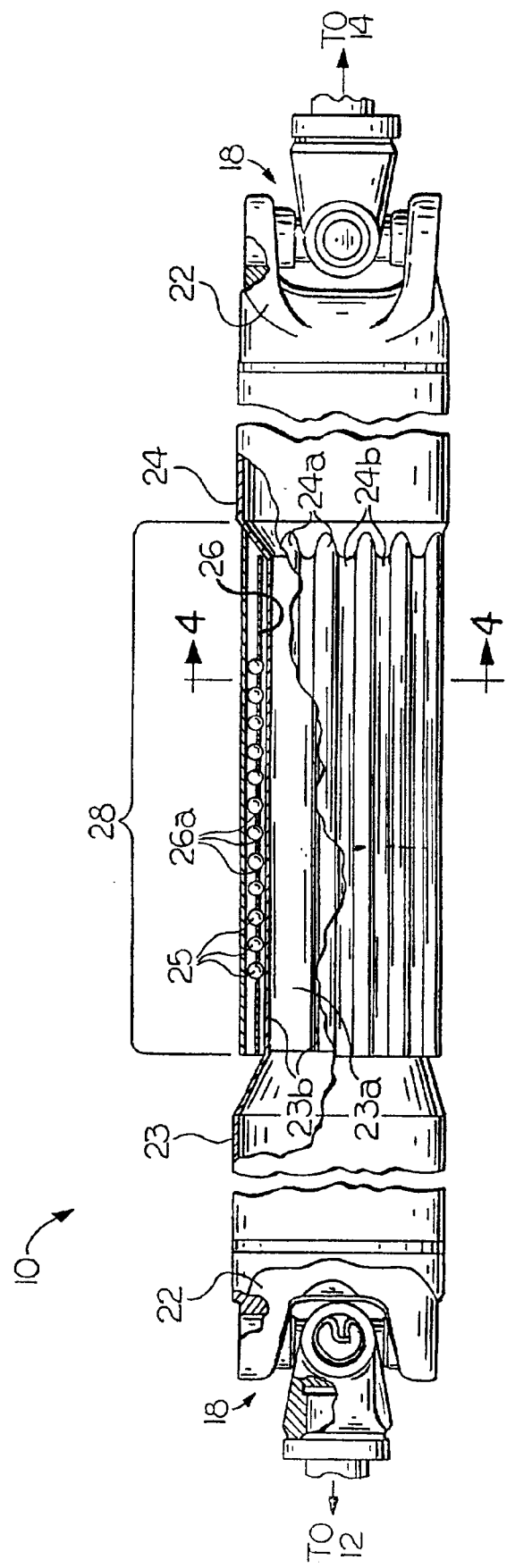
FIG. 2 is an enlarged sectional elevational view, partially broken away, of a portion of the drive train system illustrated in FIG. 1.
Figure 3:
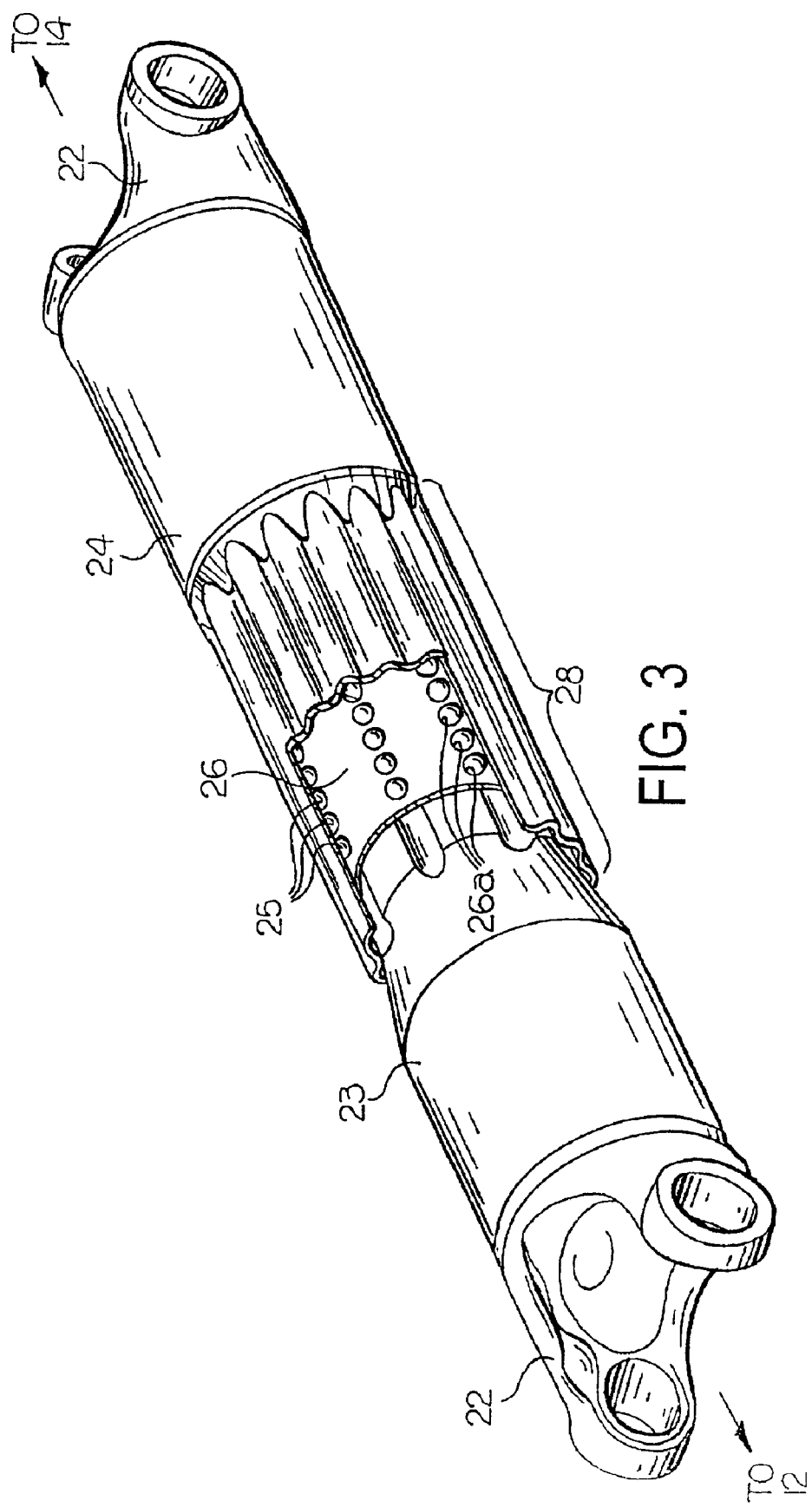
FIG. 3 is a further enlarged perspective view, partially broken away, of a driveshaft assembly and the slip joint illustrated in FIGS. 1 and 2.

The driveshaft assembly 15 includes a first driveshaft section 23 and a second driveshaft section 24 that are each shaped generally in the form of a hollow tubular member. The first and second driveshaft sections 23 and 24 may be formed from any desired material, as described in further detail below. The first and second driveshaft sections 23 and 24 are connected together by a rolling ball spline type of slip joint (indicated by the region 28) in a manner that described in detail below so as to transmit rotational force from the transmission 12 to the axle assembly 14, while accommodating a limited amount of relative axial movement therebetween. In the illustrated embodiment, and as best shown in FIG. 2, the first and second driveshaft section 23 and 24 are each formed having a relatively large diameter outer end portion, a reduced diameter inner end portion, and a tapered intermediate portion extending therebetween. However, if desired, either or both of the first and second driveshaft section 23 and 24 can be formed having a relatively uniform diameter throughout the length thereof or any other desired shape.

First and second universal joints, indicated generally at 18, are provided for rotatably connecting the output shaft of the transmission 12 to the outer end portion of the first driveshaft section 23 and for rotatably connecting the outer end portion of the second driveshaft section 24 to the input shaft of the axle assembly 14. The outer end portion of the first driveshaft section 23 is connected to the first universal joint 18 by an end fitting 22, such as a tube yoke. Similarly, the outer end portion of the second driveshaft section 24 is connected to the second universal joint 18 by an end fitting 22, such as a tube yoke. The tube yokes 22 can be secured thereto to the respective end portions of the first and second driveshaft sections 23 and 24 by any conventional means, such as by welding or adhesives, or can be formed integrally therewith.

The structures of the driveshaft assembly 15 and the slip joint 28 are more clearly illustrated in FIGS. 2 through 5. As shown therein, the first driveshaft section 23 includes a relatively smaller diameter inner end portion that extends telescopically within a relatively larger diameter inner end portion of the second driveshaft section 24. Although this invention will be described in the context of this illustrated embodiment, it will be appreciated that the first driveshaft section 23 may be formed having a relatively larger diameter end portion that extends telescopically about a relatively smaller diameter end portion of the second driveshaft section 24.

Figure 4:
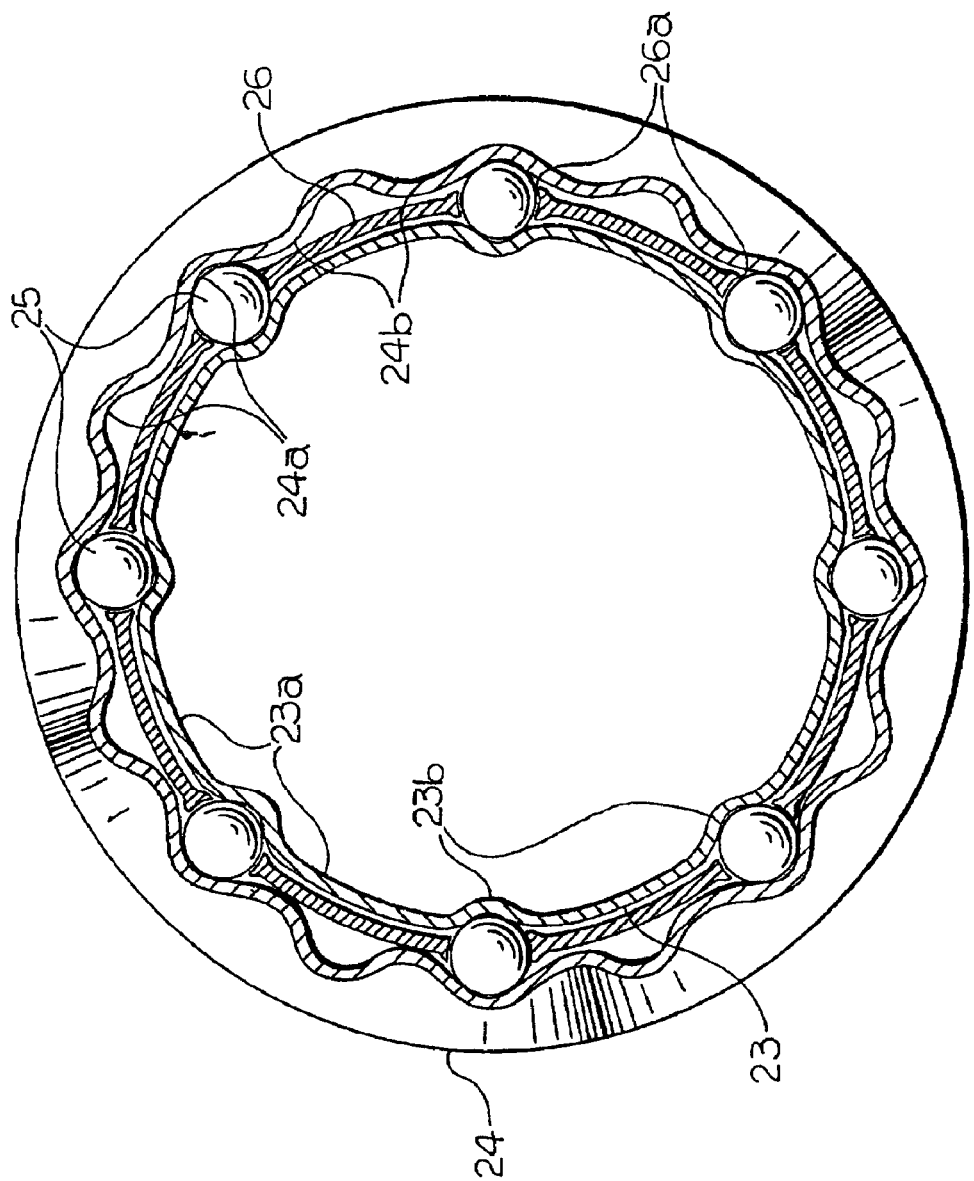
FIG. 4 is an enlarged sectional elevational view of the slip joint taken along the lines 4—4 of FIG. 2.

As best shown in FIG. 4, the relatively smaller diameter end portion of the first driveshaft section 23 has a circumferentially undulating cross-sectional shape that is defined by a plurality of radially outwardly extending regions 23a and a plurality of radially inwardly extending regions 23b. As best shown in FIG. 2, these radially outwardly extending regions 23a extend longitudinally throughout the end portion of the first drive shaft section 23. Similarly, the relatively larger diameter end portion of the second driveshaft section 24 has a circumferentially undulating cross-sectional shape that is defined by a plurality of radially outwardly extending regions 24a and a plurality of radially inwardly extending regions 24b. As also best shown in FIG. 2, these radially outwardly extending regions 24a extend longitudinally throughout the end portion of the second drive shaft section 24.

The end portion of the first driveshaft section 23 has a wall thickness T1 (see FIG. 5) that is essentially uniform throughout the circumference thereof. Similarly, the end portion of the second driveshaft section 24 has a wall thickness T2 (see FIG. 5) that is essentially uniform throughout the circumference thereof. The wall thicknesses T1 and T2 of the first and second driveshaft sections 23 and 24 may be selected as desired. For example, the first and second driveshaft sections 23 and 24 may be formed from relatively thin wall tubing having wall thicknesses in the range of from about 0.065 inch to about 0.102 inch. Alternatively, the first and second driveshaft sections 23 and 24 may be formed from relatively thick wall tubing having wall thicknesses in the range of from about 0.085 inch to about 0.250.

Preferably, the first and second driveshaft sections 23 and 24 are formed from materials that are deformed from an initial shape to the desired undulating cross sectional shape. For example, the first and second driveshaft sections 23 and 24 may be formed from a metallic material, such as from an alloy of steel or aluminum, having initial circular cross sectional shapes. Then, the end portions of the first and second driveshaft sections 23 and 24 can be deformed to have the desired undulating cross sectional shapes. Such deformation can be accomplished, for example, using conventional processes including mechanical deformation, electromagnetic pulse forming, hydroforming, explosion forming, and the like. Each of such processes is effective to deform or re-shape the end portions of the first and second driveshaft sections 23 and 24 from an initial circular cross sectional shape to the desired undulating cross sectional shape without the removal of material therefrom. It is contemplated that small variations may occur in the wall thicknesses of the first and second driveshaft sections 23 and 24 as a result of stretching during the deformation process. However, such small wall thickness variations are insignificant in comparison to the initial wall thickness of the first and second driveshaft sections 23 and 24 prior to deformation.

Alternatively, however, the first and second driveshaft sections 23 and 24 can be formed from materials that can be directly formed to have the desired undulating cross sectional shape. For example, the first and second driveshaft sections 23 and 24 may be formed from fiber-reinforced composites or similar materials that can be directly formed to have the desired undulating cross sectional shapes. Such formation can be accomplished, for example, using conventional processes including composite formation, extruding, and the like. Each of such processes is effective to initially form the end portions of the first and second driveshaft sections 23 and 24 to the desired undulating cross sectional shape without the removal of material therefrom.

The undulating cross sectional shape of the first driveshaft section 23 may extend continuously around the entire circumference thereof, as shown in FIG. 4, or may extend around only a portion of such circumference. Similarly, the undulating cross sectional shape of the second driveshaft section 24 may extend continuously around the entire circumference thereof, as also shown in FIG. 4, or may extend around only a portion of such circumference. The first and second driveshaft sections 23 and 24 may be formed having any desired number of the outwardly and inwardly extending regions 23a, 24a and 23b, 24b depending upon a number of factors, including, for example, the torque requirements of the driveshaft assembly 15, the physical sizes of the first and second driveshaft sections 23 and 24, and the materials used to form the first and second driveshaft sections 23 and 24. Also, the number of the outwardly and inwardly extending regions 23a, 23b formed on the first driveshaft section 23 may be different than the number of the outwardly and inwardly extending regions 24a, 24b formed on the second driveshaft section 24. For example, the number of the outwardly and inwardly extending regions 23a, 23b formed on the first driveshaft section 23 may be half of the number of the outwardly and inwardly extending regions 24a, 24b formed on the second driveshaft section 24, as best shown in FIG. 4. This configuration can allow more flexibility in orienting the first driveshaft section 23 relative to the second driveshaft section 24 during assembly as described below, and further to allow air to flow between the first and second driveshaft sections 23 and 24 during use.

To assemble the driveshaft assembly 15 and the slip joint 28, the end portion of the first driveshaft section 23 is inserted telescopically within the end portion of the second driveshaft section 24. As best shown in FIG. 4, the inwardly extending regions 23b of the first driveshaft section 23 are radially aligned with the outwardly extending regions 24a of the second driveshaft section 24 so as to define a plurality of raceways extending longitudinally throughout the slip joint 28. A plurality of balls 25 is disposed in each of these longitudinally extending raceways. The balls 25 provide a rotational driving connection between the first driveshaft section 23 and the second driveshaft section 24, while accommodating a limited amount of relative axial movement therebetween. The balls 25 can be formed from any suitable material that is sufficiently strong to support the torque load that is being transmitted therethrough. Preferably, the balls 25 are formed from hardened steel. The balls 25 cooperate with the inwardly extending regions 23b of the first driveshaft section 23 and the outwardly extending regions 24a of the second driveshaft section 24 to connect the first and second driveshaft sections 23 and 24 together for concurrent rotational and for relative axial movement during operation of the drive train system 10.

If desired, a cage 26 can be provided between the first driveshaft section 23 and the second driveshaft section 24 for facilitating the assembly of the slip joint 28 and for retaining the balls 25 in desired positions relative to one another during use. The cage 26 can be formed of any suitable material or combination of materials. In a preferred embodiment of the invention, the cage 26 is formed from a low friction plastic material. The cage 26 is generally hollow and cylindrical in shape and has a plurality of openings 26a formed therethrough. The openings 26a are spaced to prevent the balls 25 from touching one another during use. The openings 26a are sized to lightly engage the balls 25 to retain the balls 25 yet permit the balls 25 to freely rotate relative thereto. To accomplish this, the balls 25 may be pressed into arcuately-shaped openings 26a so that they cannot fall out, but are free to rotate relative thereto. In this manner, the balls 25 can also be retained in position during assembly of the first and second driveshaft sections 23 and 24.

Figure 5:
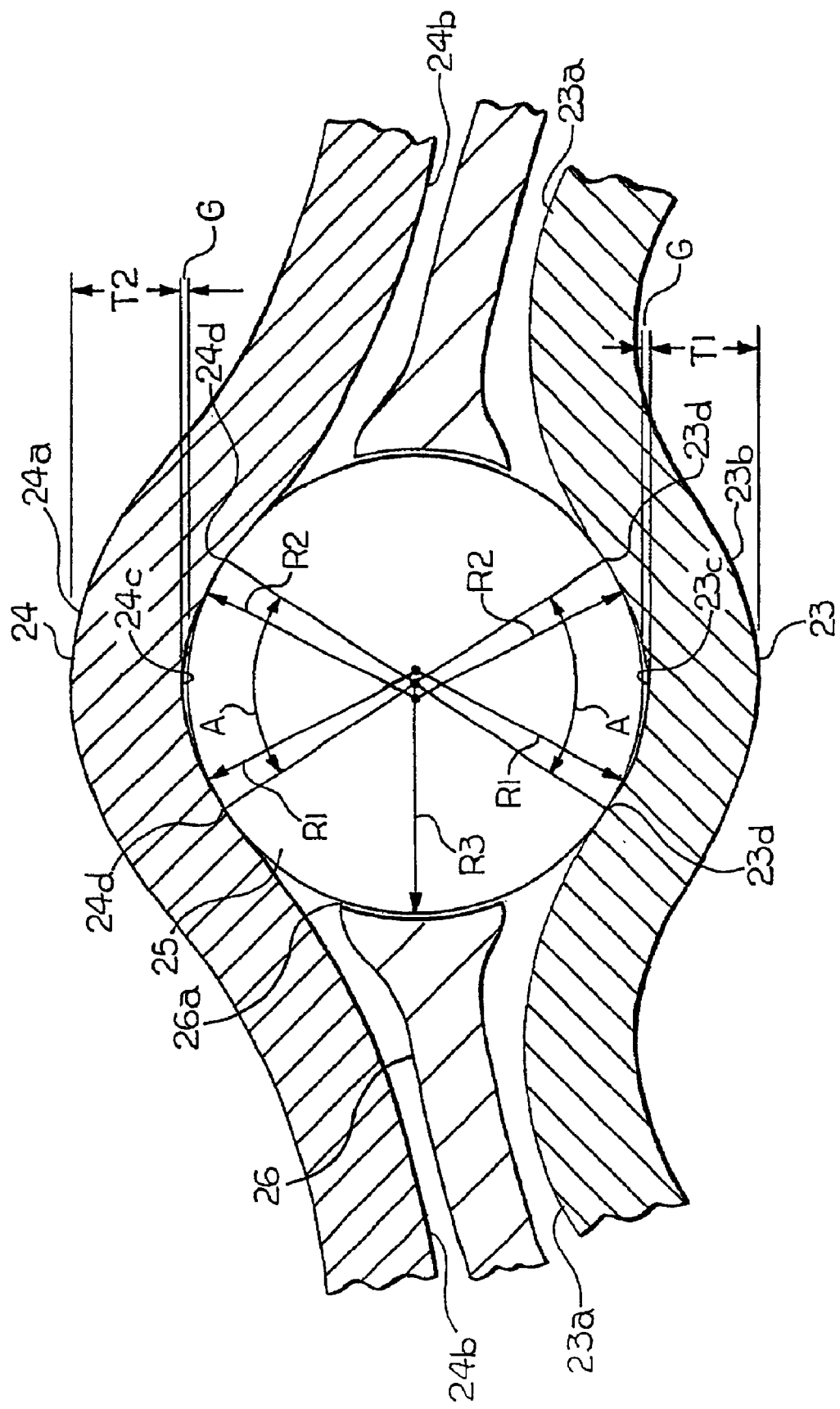
FIG. 5 is a further enlarged sectional elevational view of a portion of the slip joint illustrated in FIG. 4.

Preferably, the inwardly extending regions 23b of the first driveshaft section 23 and the outwardly extending regions 24a of the second driveshaft section 24 are both formed having gothic arch cross sectional shapes, as best shown in FIG. 5. These gothic arch cross sectional shapes are defined by opposing, overlapped radii, such as a first radius R1 and a second radius R2. The first radius R1 and the second radius R2 are each slightly larger than a radius R3 defined by the balls 25 retained therein. The focal point of the first radius R1 and the focal point the second radius R2 are offset from one another. The first radius R1 and the second radius R2 of each of the inwardly extending regions 23b of the first driveshaft section 23 intersect at an apex or point 23c. Likewise, the first radius R1 and the second radius R2 of each of the outwardly extending regions 24a of the second driveshaft section 24 intersect at an apex or point 24c. The balls 25 engage the inwardly extending regions 23b of the first driveshaft section 23 at two opposing points 23d, while the balls 25 engage the outwardly extending regions 24a of the second driveshaft section 24 at two opposing points 24d. It will be appreciated by one of ordinary skill in the art that a point of contact is not necessarily a single point of contact but rather is contact that is spread out over an area. However, this area is preferably relatively small to minimize frictional engagement therebetween, which can result in an increased about of force required to effect relatively axial movement between the first and second driveshaft sections 23 and 24. The gothic arch shape provides a gap G between the inwardly extending regions 23b of the first driveshaft section 23 and the balls 25, and further between the outwardly extending regions 24a of the second driveshaft section 24 and the balls 25.

The balls 25 also engage the inwardly extending regions 23b of the first driveshaft section 23 and the outwardly extending regions 24a of the second driveshaft section 24 at desired angles of contact A defined between the respective points of contact 23d and 24d. The angles of contact A are preferably in the range of from about thirty degrees to about forty-five degrees. The amount of stress on the outer tubular member 24 and the ball 25 is inversely proportional to the angle of contact. That is to say, a smaller angle of contact creates a "hoop load," which is a radially directed load. Increased hoop load can cause undesirable deformation of the second driveshaft section 24. Thus, the angles of contact A should not be unduly small. Conversely, there is a greater mechanical advantage (i.e., decreased contact force between the ball 25 and the second driveshaft section 24) if the angles of contact A are maximized. However, greater angles of contact A are physically limited by the resultant geometry of the second driveshaft section 24 and the space provided for the second driveshaft section 24. Hence, in determining the most desirable angles of contact A, consideration should be given to achieve an appropriate balance between minimizing the hoop load and maximizing the contact force within the physical limitations provided.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip joint comprising:
   a first tubular member having at least one inwardly extending region, said first tubular member having a wall thickness that is essentially constant throughout the circumference thereof;
   a second tubular member having at least one outwardly extending region that is aligned with said inwardly extending region of said first tubular member to define a raceway, said second tubular member having a wall thickness that is essentially constant throughout the circumference thereof;
   a ball disposed in said raceway for transmitting rotational force between said first and second tubular members, while accommodating a limited amount of relative axial movement therebetween;
   a cage disposed between said first tubular member and said second tubular member for retaining said ball within said raceway.

2. The slip joint defined in claim 1 wherein a plurality of balls is disposed in said raceway.

3. The slip joint defined in claim 1 wherein said first tubular member has a plurality of inwardly extending regions, said second tubular member has a plurality of outwardly extending regions that are aligned with said inwardly extending regions of said first tubular member to define a plurality of raceways, and a ball is disposed in each of said raceways.

4. The slip joint defined in claim 3 wherein a plurality of balls is disposed in each of said raceways.

5. The slip joint defined in claim 1 wherein said inwardly extending region of said first tubular member has a gothic arch cross sectional shape.

6. The slip joint defined in claim 1 wherein said outwardly extending region of said second tubular member has a gothic arch cross sectional shape.

7. The slip joint defined in claim 1 wherein said inwardly extending region of said first tubular member has a gothic arch cross sectional shape, and wherein said outwardly extending region of said second tubular member has a gothic arch cross sectional shape.

8. The slip joint defined in claim 1 wherein said cage is generally hollow and cylindrical in shape and has opening formed therethrough that receives said ball.

9. The slip joint defined in claim 8 wherein a plurality of balls is disposed in said raceway, and wherein said cage has a plurality of openings formed therethrough that receives said plurality of balls.

10. A driveshaft assembly for a drive train system comprising:
    a first driveshaft section having at least one inwardly extending region, said first driveshaft section having a wall thickness that is essentially constant throughout the circumference thereof;
    a second driveshaft section having at least one outwardly extending region that is aligned with said inwardly extending region of said first driveshaft section to define a raceway, said second driveshaft section having a wall thickness that is essentially constant throughout the circumference thereof;
    a ball disposed in said raceway for transmitting rotational force between said first and second driveshaft sections, while accommodating a limited amount of relative axial movement therebetween; and
    a cage disposed between said first driveshaft section and said second driveshaft section for retaining said ball within said raceway.

11. The slip joint defined in claim 10 wherein a plurality of balls is disposed in said raceway.

12. The slip joint defined in claim 10 wherein said first driveshaft section has a plurality of inwardly extending regions, said second driveshaft section has a plurality of outwardly extending regions that are aligned with said inwardly extending regions of said first driveshaft section to define a plurality of raceways, and a ball is disposed in each of said raceways.

13. The slip joint defined in claim 12 wherein a plurality of balls is disposed in each of said raceways.

14. The slip joint defined in claim 10 wherein said inwardly extending region of said first driveshaft section has a gothic arch cross sectional shape.

15. The slip joint defined in claim 10 wherein said outwardly extending region of said second driveshaft section has a gothic arch cross sectional shape.

16. The slip joint defined in claim 10 wherein said inwardly extending region of said first driveshaft section has a gothic arch cross sectional shape, and wherein said outwardly extending region of said second driveshaft section has a gothic arch cross sectional shape.

17. The slip joint defined in claim 10 wherein said cage is generally hollow and cylindrical in shape and has opening formed therethrough that receives said ball.

18. The slip joint defined in claim 17 wherein a plurality of balls is disposed in said raceway, and wherein said cage has a plurality of openings formed therethrough that receives said plurality of balls.

* * * * *